Figure 1:
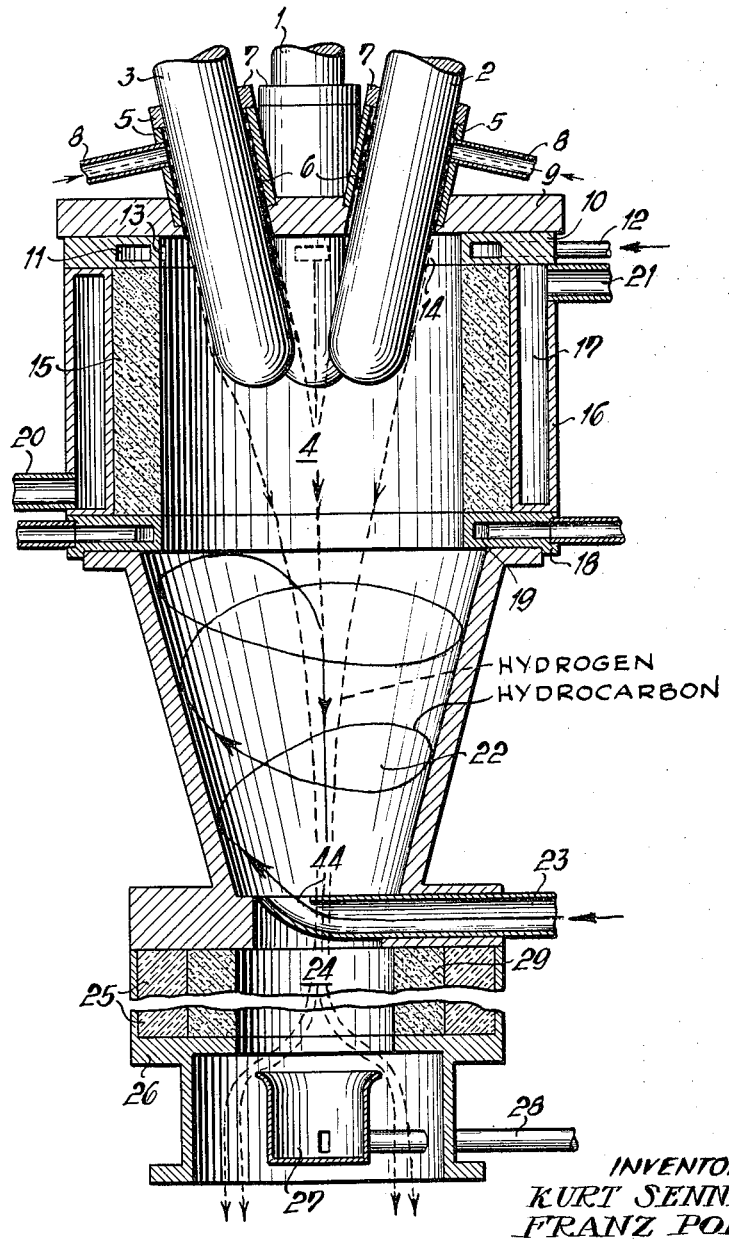

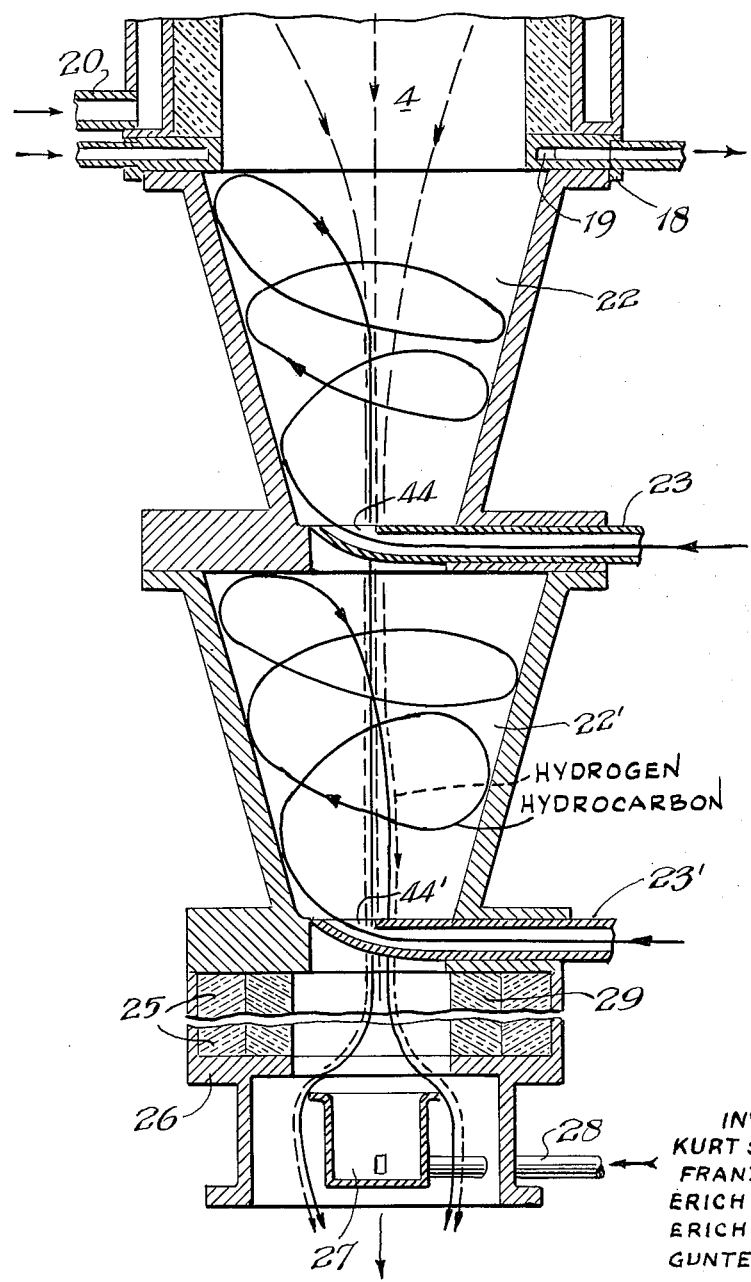

United States Patent Office 3,217,056
Patented Nov. 9, 1965

3,217,056
PROCESS AND APPARATUS FOR SPLITTING HYDROCARBONS IN AN ELECTRIC ARC
Kurt Sennewald, Knapsack, near Cologne, Franz Pohl, Leverkusen-Wustenhof, Erich Schallus, Cologne, Erich Feldmeyer, Bruhl, near Cologne, Günter Peantek, Hermulheim, near Cologne, and Heinrich Kallrath, Kerpen, Erft, Germany, assignors to Knapsack-Griesheim Aktiengesellschaft, Knapsack, near Cologne, Germany, a corporation of Germany
Filed Dec. 19, 1961, Ser. No. 160,510
Claims priority, application Germany, Dec. 24, 1960, K 42,507
14 Claims. (Cl. 260—679)

The present invention relates to a process for making acetylene, ethylene, methane and hydrogen by splitting hydrocarbons with hydrogen heated in an electric arc.

A great number of processes for splitting hydrocarbons in an electric arc are known. The hydrocarbon to be split is generally blown through the arc or the arc is produced in liquid hydrocarbon. The electric arc thus burns in a hydrocarbon atmosphere. Upon ignition of the electric arc, a discharge path consisting of ionized gas is formed between the electrodes, that is a certain portion of the gas passing through the electric arc has to be ionized. This means that in the splitting of hydrocarbons to acetylene and ethylene, which takes place at a temperature within the range of 900 to 1500° C., considerable amounts of the starting hydrocarbon must be heated to temperatures which amount to three to ten times the temperature necessary for the desired reaction. This leads to the formation of large amounts of by-products, particularly soot, whereby the yield is reduced. Even when methane or ethane, the hydrocarbons containing the largest amounts of hydrogen, are used, considerable amounts of soot are formed.

It has also been proposed to use hydrogen which has been heated in an electric arc for supplying the energy necessary for splitting hydrocarbons. When, as is usually the case in the industry, the admixture of the hot hydrogen with the hydrocarbon to be split is realized in a manner such that the hydrocarbon to be split is introduced radially through a ring of nozzles leading through the wall of the reaction chamber into the hot gas flowing axially into the mixing or reaction zone, deposits of hydrocarbon are formed in the mixing or reaction zone which, after a short time, render it impossible to continue the operation. When no defined time of stay is used and the material is chilled immediately, the formation of soot is suppressed but the extent of conversion is low, the concentration of the desired products in the reaction gas is also low and the specific energy consumption per kilogram of acetylene and ethylene is correspondingly high.

Now, we have found that in the splitting of hydrocarbons in an electric arc high extents of conversion to acetylene and ethylene can be obtained in a continuous process with a low specific energy consumption, by introducing a first partial stream of pure hydrogen or hydrocarbon-containing hydrogen which contains at most 20 gram atoms of carbon in the form of hydrocarbons per cubic meter (N.T.P. normal cubic meter at 0° C. and 1 atmosphere) of gas into an arc chamber under pressure tangentially striking the inside wall of the arc chamber and a second partial stream of hydrogen or hydrocarbon-containing hydrogen which contains at most 10 gram atoms of carbon in the form of hydrocarbons is introduced under pressure into the arc chamber along the electrodes while uniformly enveloping the latter. The two partial streams are thereby heated to such a degree that they have an energy content within the range of 2 to 7 kilowatt-hours per normal cubic meter of total gas, advantageously of 2 to 5 kilowatt-hours per normal cubic meter, when they leave the arc chamber after having been reunited and enter the reaction chamber. This highly heated hydrogen is admixed with heated gaseous or overheated vaporous starting hydrocarbons which are introduced tangentially with an angular momentum at the remote end of the reaction chamber which follows the arc chamber and conducted towards the hot hydrogen. After a reaction time within the range of 0.5 to $20 \cdot 10^{-3}$ seconds, advantageously 1 to $10 \cdot 10^{-3}$ seconds, the reaction products are chilled in known manner and worked up.

Particularly in relatively large plants, the process of the invention may also be carried out as follows: The hot reaction mixture leaving a first reaction chamber is introduced into a second reaction chamber of the same type which is arranged coaxially with and immediately after the first zone. In the second reaction chamber, the reaction mixture is admixed with a further quantity of starting hydrocarbon, whereby the hydrocarbon may be chemically different from the starting hydrocarbon used in the reaction chamber of the first stage. This procedure may be repeated by using further stages.

The splitting reaction may be completed in an afterreaction chamber.

The yield of acetylene and ethylene can be considerably increased by returning to the individual stages the byproducts formed in the course of the splitting, for example methane, ethane, propylene, butylene, methylacetylene, monovinyl acetylene and diacetylene.

In another form of the process of the invention, the starting hydrocarbon is introduced into the reaction chamber disposed immediately before the after-reaction chamber in a manner such that a portion of the starting hydrocarbon is branched-off and tangentially introduced immediately into the after-reaction chamber. In this manner, the losses of heat due to radiation are reduced and the heat energy used is better utilized.

The electric energy used per kilogram of starting hydrocarbon is advantageously within the range of 2 to 7 kilowatt-hours, advantageously 2 to 5 kilowatt-hours.

An apparatus suitable for use in carrying out the process of the invention is illustrated diagrammatically by way of example in the accompanying drawings.

Figure 2:
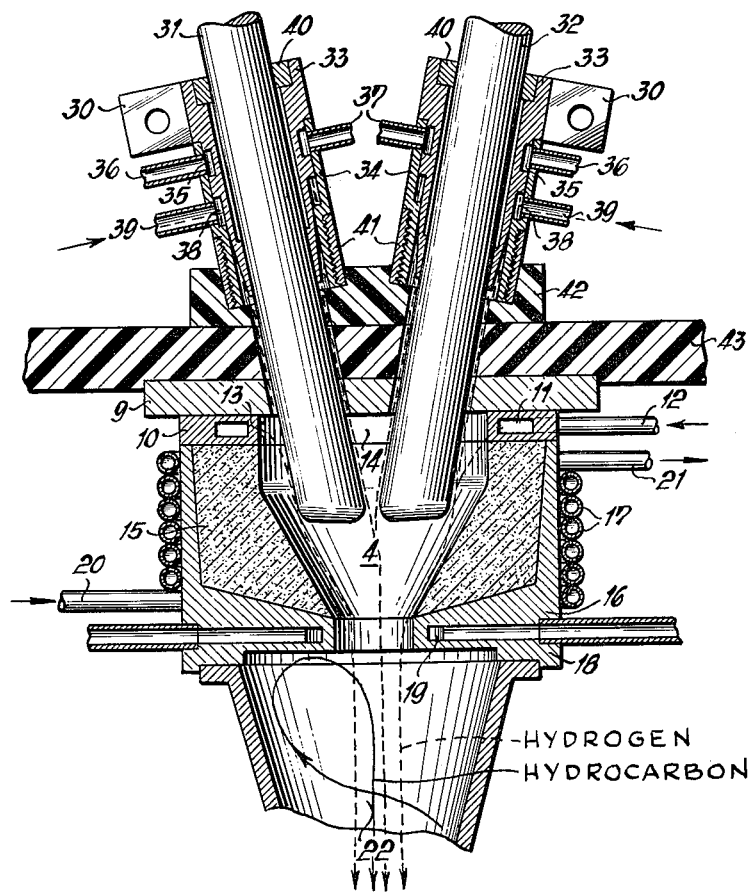

Referring to the drawings, FIG. 1 is a section of the apparatus of the invention for three-phase current. FIG. 2 is a section of the apparatus of the invention for direct current, and FIG. 3 is a section of a further embodiment of the invention.

The only essential difference between the apparatus for direct current and that for three-phase current is that for direct current two electrodes are sufficient.

The apparatus for carrying out the process of the invention, i.e. the construction for three-phase current as well as that for direct current, consists, substantially of an arc chamber in which an electric arc is maintained between the electrodes in an atmosphere of continuously introduced hydrogen, the electrodes being inserted in a gas-tight manner. The highly heated hydrogen flows from the arc chamber into the reaction chamber connected therewith where it is mixed with the hydrocarbon to split. In an after-reaction chamber following the reaction chamber, the splitting reaction is completed. The split product is then chilled and worked up.

In FIG. 1, numerals 1, 2 and 3 denote the electrodes between which the electric arc forms. Electrodes 1, 2 and 3 project from the outside into arc chamber 4. They are slightly inclined so that their axes intersect in a common point on the axis of arc chamber 4. Each of the electrodes 1, 2 and 3 is passed through a cylindrical sleeve 5 which is provided in its interior with axially parallel rifles and lands and which leaves a free ring slot 6 between the bore hole and the outer surface of the electrode. Sleeves 5 are sealed with respect to the outside by packing 7 and are provided with a short connection piece 8 for the introduction of hydrogen. They are secured in a gas-tight manner to cover 9 which closes the top of the arc chamber.

Below cover 9 and arranged centrically therewith is intermediate ring 10 which is provided with ring channel 11 and gas feed pipes 12 discharging into the ring channel. Intermediate ring 10 is furthermore provided with tangential slots 13 which connect with ring channel 11 and discharge into the ring center.

Arc chamber 4 is an axially symmetrical container which is provided with a lining 15 which is resistant to high temperatures, for example a graphite lining. This container is inserted in a second container 16 which is made of a material of good thermal conductivity, for example copper, and provided at the outside with a cooling jacket 17 or cooling pipes. The center of the bottom of container 16 is constructed in the form of a nozzle 18. Container 16 is furthermore provided with a channel 19 for a cooling agent and with inlet and outlet pipes 20 and 21.

Arc chamber 4 may be cylindrical (FIG. 1) or may taper in the direction of the reaction chamber (FIG. 2).

Arc chamber 4 may be followed by reaction chamber 22. The latter consists of a hollow casing 22 which is made of heat-resistant, non-scaling steel. It is open at the top and at the bottom and has the shape of a truncated cone of which the larger diameter is adjacent to the arc chamber. At the lower end which is of smaller diameter, channel 44 is disposed which discharges off-center adjacent a wall of casing 22. The heated or overheated starting hydrocarbon (full line in drawing) is introduced tangentially through a feed pipe 23. The starting hydrocarbon, guided by the walls of casing 22, flows in a helical line to the upper edge of reaction chamber 22 the inside diameter of which is larger than that of the nozzle 18. At this position, the hydrocarbon jet is therefore deflected substantially through an angle of 180° and flows, for reasons of symmetry, downward in the reaction chamber 22 as shown by the full line, in admixture with the hot hydrogen jet issuing from arc chamber 4. Since the opening of reaction chamber 22 tapers towards the bottom, the velocity of flow of the reaction mixture is increased.

The reaction between the hot hydrogen and the starting hydrocarbon sets in at the moment the two gas jets meet. It continues during the flow of the reaction mixture in the longitudinal axis of the reaction chamber 22 and is completed in the after-reaction chamber 24 following reaction chamber 22.

Reaction chamber 22 may be made of a heat-resistant, non-scaling iron alloy since the wall temperatures are in practice only a few hundred ° C. above the temperature of the entering starting hydrocarbon. Graphite may also be used provided that access of outside air is prevented and the highly heated vapors and gases in the reaction chamber contain neither free nor bound oxygen.

After-reaction chamber 24 consists advantageously of a graphite tube 29 which is surrounded by a heat-insulating layer 25 and housed together with said layer 25 in the protective metal case 26. In this manner, access of atmospheric oxygen to the hot graphite tube is prevented.

Before the outlet of after-reaction chamber 24, a device is disposed for chilling the issuing hot reaction products. This device consists, in the simplest case of a spraying nozzle arrangement 27 with feed pipe 28 for a cooling agent.

FIG. 2 is a longitudinal section of an arc chamber for direct current, which arc chamber can also be combined with the above apparatus consisting of a reaction chamber and an after-reaction chamber. The anode is represented at 31, the cathode at 32. The support for the electrodes and the current supply may differ from those of FIG. 1. In FIG. 2, over each electrode an inner sleeve 33 has been slipped which is provided at the lower end with longitudinal slots and therefore elastically fits the electrode to which the current is supplied with the help of terminal lugs 30. Over this inner sleeve 33, the outer sleeve 34 is screwed which is supported by nipple 41 which is held by supports 42 and 43 made of insulating material.

Inner sleeve 33 is provided with annular grooves 35 and 38 so that two ring channels are formed when the outer sleeve 34 is slipped over. Of these, upper ring channel 35 is charged with a cooling agent which is introduced through short inlet pipe 36 and withdrawn through short outlet pipe 37.

Lower ring channel 38 serves for the reception and distribution of hydrogen which is introduced through short inlet pipe 39. Since it communicates with the longitudinal slots S formed by tapering of the lower end of inner sleeve 33, a uniform distribution of hydrogen over the periphery of the electrode is ensured. FIG. 3 shows an embodiment wherein a second reaction chamber 22' with hydrocarbon feed line 23' and offset discharge 44' is positioned between the chamber 22 and after reaction chamber 24 of FIG. 1.

In the same manner as for direct current, the modes of construction described above may be used for single-phase current arrangements and polyphase current arrangements.

The following examples serve to illustrate the invention but they are not intended to limit it thereto:

*Example 1*

60 normal cubic meters per hour of hydrogen were introduced into arc chamber 4 in three equal partial streams which flowed around graphite electrodes 1, 2 and 3 of which each has a diameter of 25 mm. Walls 15 of the arc chamber were of graphite surrounded with a water-cooling system. To reduce the transfer of heat from the arc zone to the graphite, wall, a further 35 normal cubic meters per hour of hydrogen were introduced tangentially at 13.

The electric arc was ignited by bringing the electrodes 1, 2 and 3 in contact with one another. In operation, the distance between the electrodes was 5 to 10 mm. at a tension of 200 volts (interlinked) and 450 amperes, which corresponded to a power input of 260 kilowatt-hours. The electrodes were fed gradually as they were consumed. Under the working conditions used, the electrode consumption amounted to 0.3 gram of carbon per kilowatt-hour set free. The feeding of the electrodes was effected automatically with regard of the arc voltage.

The hydrogen was heated in the arc chamber and left the latter through copper nozzle 17 cooled with water. The said copper nozzle 17 was followed by the mixing and reaction chamber 22 tapering towards the bottom and made of heat-resistent iron-alloy. Into the mixing and reaction chamber, 75 kilograms per hour of evaporated light gasoline were introduced tangentially at 23. The light gasoline contained 84% of carbon and 16% of hydrogen. The gasoline vapor flowed with an angular momentum striking the wall of the reaction chamber 22 to meet the hydrogen. The gas mixture which had already been substantially reacted flowed from chamber 22 into the after-reaction chamber 24 consisting of a thermally well insulated graphite tube 160 mm. long. The gas was chilled with water introduced through a nozzle at 28 and, after further cooling in a trickling tower, it flowed into a gasometer in order to be measured.

194.4 normal cubic meters per hour of a dry gas were measured. The gas had the following average composition:

| | Percent by volume |
|---|---|
| $CH_4$ | 8.25 |
| $C_2H_6$ | 0.2 |
| Unreacted gasoline hydrocarbons | 0.9 |
| $C_2H_4$ | 6.5 |
| $C_3H_6$ | 0.6 |
| $C_2H_2$ | 14.2 |
| Methylacetylene, allene and diacetylene | 0.7 |
| Benzene | 0.3 |
| Remainder hydrogen. | |

With a total extent of conversion of 93%, 63.5%, calculated on the gasoline used as the starting material, had been converted into acetylene and ethylene. Since the hydrocarbons that had not undergone reaction and the propylene could be returned to the process the yield of acetylene and ethylene amounted to about 70% by weight, calculated on the gasoline used as the starting material.

The amount of soot and tar formed was 0.15%, calculated on the gasoline used as the starting material.

Per kilogram of gasoline used as the starting material, 0.21 normal cubic meter of methane and 0.5 normal cubic meter of hydrogen were obtained.

When the acetylene formed was charged with the total energy expended on the splitting reaction, a specific energy consumption of 8.0 kilowatt-hours per kilogram of acetylene was obtained. Calculated on the acetylene and ethylene, the energy consumption amounted to 5.4 kilowatt-hours per kilogram of acetylene and ethylene.

*Example 2*

In an apparatus analogous to that described in Example 1, 370 normal cubic meters of hydrogen were heated in an electric arc of a power input of 1100 kilowatts. After leaving the discharge zone, the hot hydrogen was admixed with 565 kilograms of light gasoline of a final boiling point of 110° C.

896 normal cubic meters per hour of dry split gas of the following composition were obtained:

| | Percent by volume |
|---|---|
| $CH_4$ | 7.5 |
| $C_2H_6$ | 0.3 |
| $C_2H_2$ | 13.5 |
| $C_2H_4$ | 7.7 |
| $C_3H_6$ | 1.45 |
| $C_6H_6$ | 0.3 |
| Higher acetylenes | 1.17 |
| Saturated hydrocarbons | 7.0 |
| Remainder hydrogen. | |

The specific energy consumption per kilogram of acetylene amounted to 7.8 kilowatt-hours, or 4.8 kilowatt-hours per kilogram of acetylene and ethylene.

*Example 3*

In the apparatus described in Example 1, a mixture of 83.5 normal cubic meters per hour of hydrogen and 7 normal cubic meters per hour of methane were heated in an electric arc of a power input of 316 kilowatts. After leaving the arc chamber, the hot hydrogen was admixed with 66 kilograms of light gasoline.

191.3 normal cubic meters per hour of dry split gas of the following composition were obtained:

| | Percent by volume |
|---|---|
| $CH_4$ | 7.62 |
| $C_2H_6$ | 0.1 |
| $C_2H_4$ | 5.05 |
| $C_2H_2$ | 16.8 |
| $C_3H_6$ | 0.18 |
| Methylacetylene, allene and diacetylene | 0.83 |
| Benzene | 0.3 |
| Remainder hydrogen. | |

With a total extent of conversion of 100%, the extent of conversion to acetylene and ethylene was 70% by weight.

The specific energy consumption per kilogram of acetylene amounted to 8.4 kilowatt-hours, or 6.4 kilowatt-hours per kilogram of acetylene and ethylene.

*Example 4*

The apparatus described in Examples 1 and 2 was used to heat 95 normal cubic meters of hydrogen in an electric arc of a power of 276 kilowatts. After leaving the arc chamber, the hot hydrogen was mixed with 70 kilograms of a mixture of light gasoline and monovinyl acetylene which contained 23% by weight of monovinyl acetylene.

177.4 normal cubic meters of a dry split gas of the following composition were obtained:

| | Percent by volume |
|---|---|
| $CH_4$ | 6.28 |
| $C_2H_6$ | 0.1 |
| Unreacted gasoline hydrocarbons | 0.3 |
| $C_2H_4$ | 4.42 |
| $C_3H_6$ | 0.45 |
| $C_2H_2$ | 16.48 |
| Methylacetylene, allene and diacetylene | 1.18 |
| Benzene | 0.4 |
| Remainder hydrogen. | |

The specific energy consumption amounted to 8.1 kilowatt-hours per kilogram of acetylene, or 6.3 kilowatt-hours per kilogram of acetylene and ethylene.

*Example 5*

In an apparatus analogous to that of Example 1, 700 normal cubic meters of hydrogen were heated in an electric arc of a power input of 1870 kilowatts. After leaving the arc chamber, the hot hydrogen was mixed in the reaction chamber with 725 kilograms of light gasoline of a final boiling point of 110° C. The after-reaction chamber consisted of a graphite cylinder the inner walls of which were flushed with an additional stream of 100 kilograms of gasoline vapor which was introduced tangentially and conducted downward in a helical line.

1547 normal cubic meters of dry split gas of the following composition were obtained:

| | Percent by volume |
|---|---|
| Acetylene | 12.9 |
| Ethylene | 8.45 |
| Propylene | 1.55 |
| Methane | 8.55 |
| Higher acetylenes | 1.3 |
| Benzene | 0.31 |
| Saturated hydrocarbons | 3.88 |
| Remainder hydrogen. | |

The specfic energy consumption per kilogram of acetylene amounted to 8.0 kilowatt-hours, or 4.7 kilowatt-hours per kilogram of acetylene and ethylene.

We claim:

1. A process for splitting hydrocarbons for recovering acetylene with the aid of an electric arc burning between consumable carbon electrodes which comprises heating hydrogen gas by introducing into the electric arc zone a first partial stream of said hydrogen selected from the group consisting of pure hydrogen and hydrocarbon-containing hydrogen containing up to 20 gram atoms of carbon in the form of hydrocarbons per normal cubic meter of gas tangentially at the upper edge of said zone so as to strike the inside wall of said zone and introducing a second partial stream of hydrogen selected from the group consisting of pure hydrogen and hydrocarbon-containing hydrogen containing at most 10 gram atoms of carbon in the form of hydrocarbons per normal cubic meter of gas axially along the electrodes so as to uniformly envelop the electrodes, imparting to the total reunited streams of hydrogen an energy content within the range of 2 to 7 kw.-hr. per m.$^3$ (N.T.P.) in the electric arc zone, mixing the heated hydrogen while the electric arc is burning with gaseous and vaporous starting hydrocarbon, respectively, in a frusto-conical reaction zone which follows the arc zone for performing the conversion in a total reaction time within the range of $0.5 \times 10^{-3}$ to $20 \times 10^{-3}$ seconds, the starting hydrocarbon being introduced tangentially at the end of the reaction zone remote from the arc zone and flowing in a helical line along the wall of the reaction zone in the direction of the inlet into the reaction zone for the hot hydrogen, deflecting the hot mixture which is undergoing reaction with the heated hydrogen passing into the reaction zone along the center axis of the reaction zone into an after-reaction zone connected with the reaction zone, and chilling the split product when it leaves the after-reaction zone after the reaction has been completed.

2. The process of claim 1, wherein an energy amount within the range of 2 to 5 kilowatt-hours per normal cubic meter is imparted to the hydrogen in the electric arc.

3. The process of claim 1, wherein the reaction time in the reaction and after-reaction zones is within the range of $1 \cdot 10^{-3}$ to $10 \cdot 10^{-3}$ seconds.

4. The process of claim 1, wherein the starting hydrocarbon is preheated.

5. The process of claim 1, wherein gaseous and liquid by-products are obtained which are returned to the splitting process.

6. The process of claim 1, wherein the heated reaction mixture leaving said reaction zone is introduced in an axial direction into a second reaction zone where it is admixed with a further amount of starting hydrocarbon.

7. An apparatus for splitting hydrocarbons for recovering acetylene with the aid of an electric arc between consumable electrode which comprises a coaxial arrangement of chambers, said chambers including an arc chamber, a cover closing the top of said arc chamber, a cooling jacket around said arc chamber, supports and openings for the electrodes in said cover, means for feeding a first partial stream of hydrogen tangentially at the upper edge of said arc chamber to strike its inside wall, means for feeding a second partial stream of hydrogen axially along the electrodes to envelop the electrodes when they are extended into the arc chamber through their respective cover openings, a reaction chamber having the shape of a truncated cone of which the larger diameter faces the arc chamber and is connected thereto, an after-reaction chamber, means for chilling the reaction products leaving the after-reaction chamber, and hydrocarbon feed means for the reaction chamber provided at the end that is remote from the arc chamber.

8. The apparatus of claim 7 wherein each of the electrode supports inserted in the openings for the electrodes in the cover consists of a nipple inserted in the opening, an inner sleeve projecting into the nipple, said inner sleeve being provided with longitudinal slots at the anterior end which fits the electrode, said inner sleeve having in the middle an inside diameter greater than the electrode diameter, a terminal lug at its back end for the supply of current, two ring channels at its periphery, one of which communicates with the longitudinal slots of the inner sleeve, an outer sleeve screwed into the nipple, cooling medium feed and discharge means for said outer sleeve, and a feed means for hydrogen for said outer sleeve.

9. The apparatus of claim 7, wherein the arc chamber tapers towards the bottom.

10. The apparatus of claim 7 wherein at least one additional reaction chamber of the same kind is coaxially connected to the first reaction chamber, the delivery side of smaller inside diameter of the preceding reaction chamber being connected to the admission side of larger inside diameter of the following reaction chamber, and each reaction chamber is provided with a separate feed pipe for the starting hydrocarbons.

11. The apparatus of claim 7, wherein the intermediate ring inserted between the cover and the arc chamber, and the bottom of the arc chamber inserted between the arc chamber and the reaction chamber are provided with ring channels, one of which channels is provided with feed pipes for hydrogen and with tangential outlet openings, and the other channel serves to conduct a cooling agent.

12. The apparatus of claim 7, wherein that portion of the reaction chamber which is remote from the arc chamber is provided with an offset channel with tangential outlet openings and a hydrocarbon feed pipe.

13. The apparatus of claim 7, wherein an intermediate ring is inserted between the reaction chamber and the after-reaction chamber, and said ring has a channel with tangential outlet openings and a hydrocarbon feed pipe.

14. The apparatus of claim 7, wherein the after-reaction chamber contains a heat-resistent lining surrounded by a heat-insulating layer.

References Cited by the Examiner
UNITED STATES PATENTS

| | | | |
|---|---|---|---|
| 2,892,067 | 6/59 | Donald et al. | 219—75 |
| 2,916,534 | 12/59 | Schallus et al. | 260—679 |
| 2,923,811 | 2/60 | Feldmeyer et al. | 219—75 |
| 2,942,043 | 6/60 | Rummert | 260—679 |
| 2,985,698 | 5/61 | Pechtold et al. | 260—679 |
| 3,051,639 | 5/61 | Anderson | 260—679 |
| 3,079,325 | 2/63 | Butenuth et al. | 260—679 X |

ALPHONSO D. SULLIVAN, *Primary Examiner.*